United States Patent [19]
Ray et al.

[11] Patent Number: 5,716,102
[45] Date of Patent: Feb. 10, 1998

[54] EMERGENCY LOCKING MECHANISM WITH ORIENTATION CONTROL

[75] Inventors: Gary M. Ray, Royal Oak; Gene L. Scofield, Warren, both of Mich.

[73] Assignee: TRW Vehicle Safety Systems Inc., Lyndhurst, Ohio

[21] Appl. No.: 721,283

[22] Filed: Sep. 26, 1996

[51] Int. Cl.⁶ ............................................. A62B 35/02
[52] U.S. Cl. ................. 297/478; 297/216.13; 242/384.4
[58] Field of Search .................... 297/216.13, 216.14, 297/478, 480; 242/384.4

[56] References Cited

U.S. PATENT DOCUMENTS

| | | |
|---|---|---|
| 4,063,695 | 12/1977 | Oshikawa . |
| 4,164,337 | 8/1979 | Blom ................................ 297/478 X |
| 4,556,177 | 12/1985 | Kuwakado et al. ............... 242/384.4 |
| 4,610,480 | 9/1986 | Yamada et al. ......................... 297/478 |
| 4,978,087 | 12/1990 | Tauber . |
| 5,181,758 | 1/1993 | Sandvik . |
| 5,495,994 | 3/1996 | Rumpf et al. ..................... 297/478 X |

FOREIGN PATENT DOCUMENTS 2235124  2/1991  United Kingdom .

*Primary Examiner*—Peter R. Brown
*Attorney, Agent, or Firm*—Tarolli, Sundheim, Covell, Tummino & Szabo

[57] ABSTRACT

An apparatus (10) includes a vehicle seat (12) with an upper frame (28) supported to tilt on a lower frame (18). An emergency locking mechanism (60) is supported on the upper frame (28). The apparatus (10) further includes an orientation mechanism (106) including an elongated flexible driving member (114). The orientation mechanism (106) moves the driving member (114) longitudinally in one direction upon tilting of the upper frame (28), and moves the driving member (114) longitudinally in an opposite direction upon opposite tilting of the upper frame (28). The orientation mechanism (106) tilts the emergency locking mechanism (60) a controlled amount relative to the upper frame (28) in response to longitudinal movement of the driving member (114).

16 Claims, 3 Drawing Sheets

EMERGENCY LOCKING MECHANISM WITH ORIENTATION CONTROL

FIELD OF THE INVENTION

The present invention relates to an emergency locking mechanism for a seat belt retractor which is mounted on the back of a vehicle seat. The present invention particularly relates to an apparatus which controls the orientation of the emergency locking mechanism relative to the seat.

BACKGROUND OF THE INVENTION

A seat belt system for restraining an occupant of a vehicle ordinarily includes seat belt webbing, a seat belt buckle, and a seat belt retractor. A locking tongue on the webbing is releasably lockable in the buckle when the webbing is extended around the vehicle occupant. The retractor includes a spool upon which the webbing is wound. The spool rotates in an unwinding direction when the vehicle occupant extracts the webbing from the retractor and moves the webbing toward the extended position in which the tongue is locked in the buckle. When the tongue is subsequently unlocked and released from the buckle, a rewind spring in the retractor rotates the spool in a winding direction to retract the webbing into the retractor.

When the vehicle experiences a crash and/or the vehicle decelerates at or above a predetermined threshold level, the occupant moves forcefully against the webbing. The force which is then applied to the webbing by the occupant urges the webbing to move outward from the retractor. Therefore, a seat belt retractor typically includes an emergency locking mechanism which is actuated in response to sudden vehicle deceleration and/or sudden extracting movement of the webbing. The emergency locking mechanism then blocks unwinding rotation of the spool to prevent the webbing from moving outward from the retractor.

An emergency locking mechanism may include an inertia weight. Such an emergency locking mechanism is actuated when the inertia weight moves from an unactuated position to an actuated position under the influence of vehicle deceleration. The inertia weight may comprise a pendulum which swings to an actuated position, or a movable ball which rolls to an actuated position. In each case, the emergency locking mechanism is supported in the vehicle in a predetermined orientation in which the inertia weight normally rests in the unactuated position.

A seat belt retractor is sometimes mounted on the back of a vehicle seat. In such cases, an orientation mechanism maintains the emergency locking mechanism in its predetermined orientation when the seat back tilts upon being reclined or raised by a vehicle occupant. One type of orientation mechanism maintains the emergency locking mechanism in a predetermined orientation relative to the force of gravity. That type of orientation mechanism permits the emergency locking mechanism to tilt relative to the seat in response to the force of gravity when the inclination of the seat back changes. This prevents the force of gravity from inadvertently moving the inertia weight from the unactuated position to the actuated position when the seat back is being reclined or raised by a vehicle occupant.

Another type of orientation mechanism maintains the emergency locking mechanism in a predetermined orientation relative to the seat independently of the force of gravity. This type of orientation mechanism tilts the emergency locking mechanism relative to the seat when the seat back is being inclined or raised, but does not tilt the emergency locking mechanism relative to the seat when the inclination of the entire vehicle changes. This enables the force of gravity to move the inertia weight from the unactuated position to the actuated position when a change in vehicle inclination is great enough to require the seat belt webbing to restrain a vehicle occupant. Such a change in vehicle inclination may occur when the vehicle travels on a steep slope and/or when the vehicle tilts or overturns in a crash.

A known orientation mechanism of the latter type includes a cable extending between the seat back and the bottom of the seat. An upper end portion of the cable extends into the retractor on the seat back. A lower end portion of the cable is connected to the bottom of the seat, and is parallel to the pivotal axis of the seat back. This arrangement causes the lower end portion of the cable, and hence the entire cable, to twist when the seat back pivots about the axis. A lever on the upper end portion of the cable tilts the emergency locking mechanism relative to the seat back when the cable is twisted in this manner.

SUMMARY OF THE INVENTION

In accordance with the present invention, an apparatus comprises a vehicle seat and an emergency locking mechanism. The seat has an upper frame supported to tilt on a lower frame. The emergency locking mechanism is supported on the upper frame. The apparatus further comprises orientation means for maintaining a predetermined orientation of the emergency locking mechanism relative to the lower frame independently of the force of gravity when the upper frame tilts on the lower frame. The orientation means includes an elongated flexible driving member.

The orientation means moves the driving member longitudinally when the upper frame tilts upon being reclined or raised by a vehicle occupant. Specifically, the orientation means moves the driving member longitudinally in one direction in response to tilting of the upper frame, and moves the driving member longitudinally in an opposite direction in response to opposite tilting of the upper frame. The orientation means tilts the emergency locking mechanism a controlled amount relative to the upper frame in response to such longitudinal movement of the driving member.

In a preferred embodiment of the present invention, a lower pulley structure is supported on the lower frame. The orientation means moves the driving member in one direction by winding the driving member onto the lower pulley structure. The orientation means moves the driving member in an opposite direction by unwinding the driving member from the lower pulley structure. An upper pulley structure and the emergency locking mechanism are rotatable together on the upper frame. The orientation means rotates the upper pulley structure, and thus tilts the emergency locking mechanism, by winding the driving member onto the upper pulley structure, and by unwinding the driving member from the upper pulley structure, in response to longitudinal movement of the driving member.

In the preferred embodiment of the present invention, a spring biases the upper pulley structure to rotate in a winding direction. The driving member is a steel cable extending between the pulley structures under tension induced by the spring. In this arrangement, the cable rotates the upper pulley structure against the bias of the spring upon tilting of the upper frame. The spring rotates the upper pulley structure oppositely upon opposite tilting of the upper frame. Preferably, the cable winds onto one pulley structure simultaneously and equally as it unwinds from the other pulley structure.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF THE PREFERRED EMBODIMENT

Figure 1:
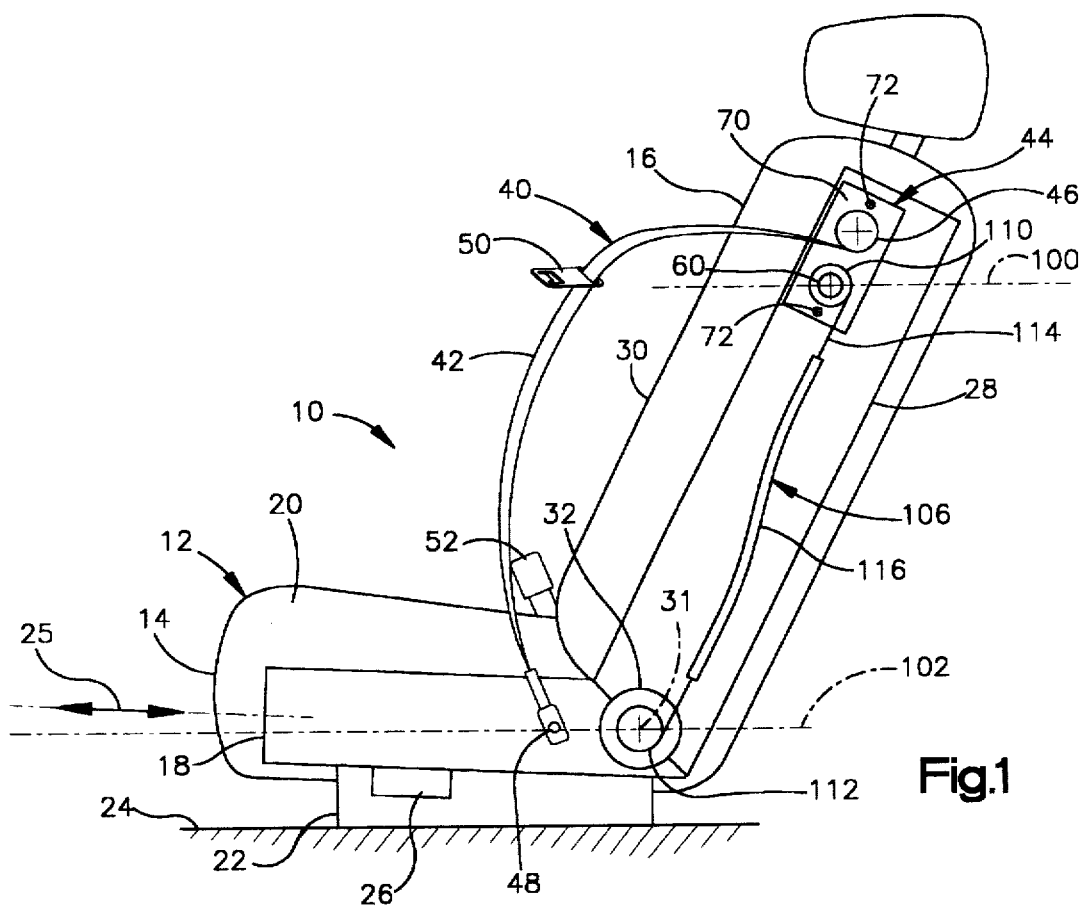
FIG. 1 schematic view of an apparatus comprising a preferred embodiment of the present invention.

An apparatus 10 comprising a preferred embodiment of the present invention is shown schematically in FIG. 1. The apparatus 10 includes a vehicle seat 12 with a seat cushion 14 and a seat back 16. The seat cushion 14 comprises a lower frame 18 and a lower cover 20. A track structure 22 supports the lower frame 18 on a vehicle floor 24 for sliding movement in opposite directions, as indicated by the arrow 25, and has an adjustment mechanism 26. Alternatively, the lower frame 18 could be mounted on the floor 24 without a sliding track. The seat back 16 comprises an upper frame 28 and an upper cover 30. The upper frame 28 is supported to tilt on the lower frame 18.

In the preferred embodiment of the present invention, the upper frame 28 is supported on the lower frame 18 for tilting movement that consists of pivotal movement about a fixed pivotal axis 31. Another adjustment mechanism 32 controls pivotal movement of the upper frame 28 about the axis 31. The upper frame 28 could alternatively be supported on the lower frame 18 for tilting movement that has components of both orbital and pivotal movement, as known in the art. In any case, the adjustment mechanism 32 (and the adjustment mechanism 26) may be motorized or manually operable.

A seat belt system 40 is mounted on the seat 12. As shown schematically in FIG. 1, the seat belt system 40 includes seat belt webbing 42 and a seat belt retractor 44. The retractor 44 has a rotatable spool 46, and is mounted on the upper frame 28 near the upper end of the seat back 16. An upper end portion of the webbing 42 is wound on the spool 46 in a known manner. The retractor 44 may alternatively be mounted on a middle or lower portion of the upper frame 28, in which case the webbing 42 would be routed up and over a structural turning guide such as a loop, bar, or spool at or near the upper end of the frame 28.

A lower end portion of the webbing 42 is anchored to the lower frame 18 by an anchor structure 48 at one side of the seat cushion 14. A locking tongue 50 on the webbing 42 is releasably lockable in a buckle 52 which is anchored to the lower frame 18 at the opposite side of the seat cushion 14. The webbing 42 and the buckle 52 could alternatively be anchored directly to the vehicle floor 24.

The retractor 44 further has an emergency locking mechanism 60. The emergency locking mechanism 60 in the preferred embodiment of the present invention is an inertia locking mechanism. If the vehicle experiences an emergency condition such as, for example, deceleration, tilt, or rollover at or above a predetermined threshold level, this indicates the occurrence of a crash or other event having at least a predetermined threshold level of severity. The threshold level of severity is a level at which the webbing 42 is required to restrain an occupant of the seat 12. Accordingly, the inertia locking mechanism 60 responds by blocking unwinding rotation of the spool 46 so that the webbing 42 can restrain an occupant of the seat 12.

Figure 2:
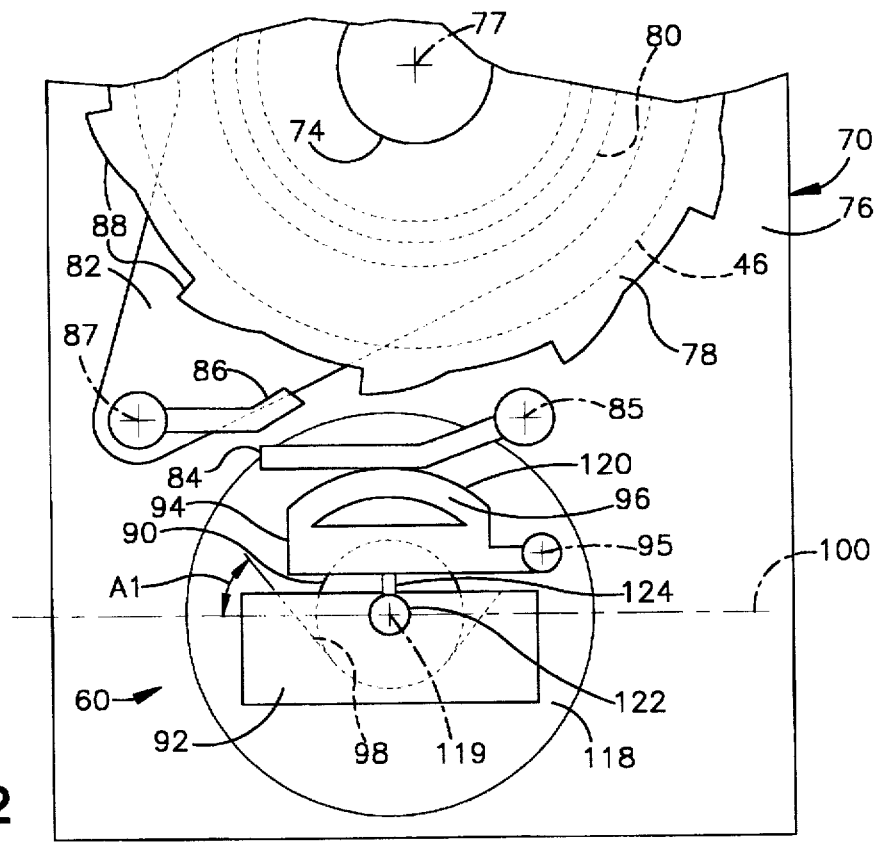
FIG. 2 an enlarged schematic view of parts shown in FIG. 1.

A retractor frame 70 supports the spool 46 and the inertia locking mechanism 60 on the upper frame 28 of the seat 12. The retractor frame 70 is fixed to the upper frame 28 by fasteners 72, as shown schematically in FIG. 1. As shown in the enlarged schematic view of FIG. 2, the spool 46 has a central shaft 74. The shaft 74 extends longitudinally between a pair of opposed retractor frame walls 76, one of which is shown in FIG. 2, and is journalled in the frame walls 76 for rotation about a spool axis 77. A ratchet wheel or a pair of ratchet wheels 78, one of which is shown in FIG. 2, are fixed to the opposite ends of the shaft 74 for rotation about the spool axis 77 with the spool 46. A rewind spring 80 biases the spool 46 in a winding direction, which is counterclockwise as viewed in FIG. 2.

Figure 3:
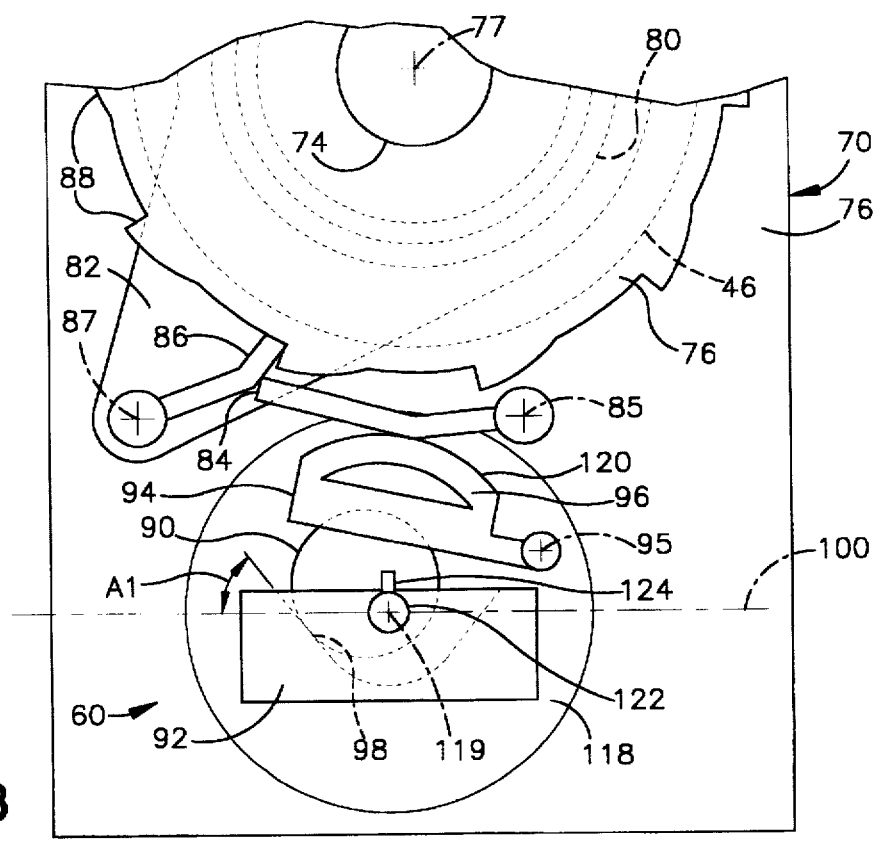
FIG. 3 is a view showing the parts of FIG. 2 in different positions.

An intermediate actuator 82 is journalled about the spool axis 77. A pilot pawl 84 is supported on the frame 70 for pivotal movement about an axis 85. The pilot pawl 84 is thus movable into and out of engagement with a locking pawl 86. The locking pawl 86 is supported on the intermediate actuator 82 for pivotal movement about a corresponding axis 87, and is pivotal from an unlocked position, as shown in FIG. 2, to a locked position, as shown in FIG. 3. When the locking pawl 86 is in the locked position, it extends into the path of movement of ratchet teeth 88 on the ratchet wheel(s) 78 to block unwinding rotation of the spool 46.

The inertia locking mechanism 60 also is supported on the retractor frame 70. As shown in FIG. 2, the inertia locking mechanism 60 includes an inertia weight in the form of a movable sensor ball 90. The sensor ball 90 rests in a ball housing 92. A sensor lever 94 rests upon the sensor ball 90, and is pivotal about a corresponding axis 95 relative to the ball housing 92. A crown portion 96 of the lever 94 supports the pilot pawl 84 in the position in which it is shown in FIG. 2.

When the vehicle experiences an emergency condition such as deceleration, tilt, or rollover at or above the predetermined threshold level, as described above, the inertia of the sensor ball 90 causes it to roll up a ramp surface 98 in the ball housing 92 from an unactuated position, as shown in FIG. 2, to an actuated position, as shown in FIG. 3. As the sensor ball 90 moves to the actuated position, it lifts the lever 94 and the pilot pawl 84 sufficiently for the pilot pawl 84 to lift the locking pawl 86 to the locked position.

As further shown in FIGS. 2 and 3, the ramp surface 98 in the ball housing 92 is inclined at an angle A1 from a baseline 100 of the inertia locking mechanism 60. The baseline 100 of the inertia locking mechanism 60 is horizontal and is parallel to a baseline 102 (FIG. 1) of the lower frame 18. The inertia locking mechanism 60 thus has a predetermined orientation relative to the lower frame 18.

Since the inertia locking mechanism 60 is mounted on the upper frame 28, it moves relative to the lower frame 18 when the upper frame 28 tilts relative to the lower frame 18. Therefore, the apparatus 10 further includes an orientation mechanism 106 (FIG. 1). The orientation mechanism 106 maintains the predetermined orientation of the inertia locking mechanism 60 relative to the lower frame 18 when the upper frame 28 tilts relative to the lower frame 18.

As shown in FIG. 1, the orientation mechanism 106 in the preferred embodiment of the present invention is a non-motorized apparatus including an upper pulley 110, a lower pulley 112, and an elongated, flexible driving member 114 extending longitudinally between the pulleys 110 and 112. The driving member 114 in the preferred embodiment of the present invention is a steel cable extending between the pulleys 110 and 112 through a conduit 116. As shown in FIGS. 2 and 3, the orientation mechanism 106 further includes a hub 118 on the retractor frame 70.

The hub 118 is journalled in a wall 76 of the retractor frame 70 for rotation about an axis 119 relative to the retractor frame 70. The inertia locking mechanism 60 is mounted on the hub 118 for rotation about the axis 119 with the hub 118. As upper edge surface 120 of the crown 96 has an arcuate contour that ensures that the crown 96 will continue to support the pilot pawl 84 in the position of FIG. 2 when the inertia locking mechanism 60 rotates about the axis 119 relative to the retractor frame 70.

Figure 4:
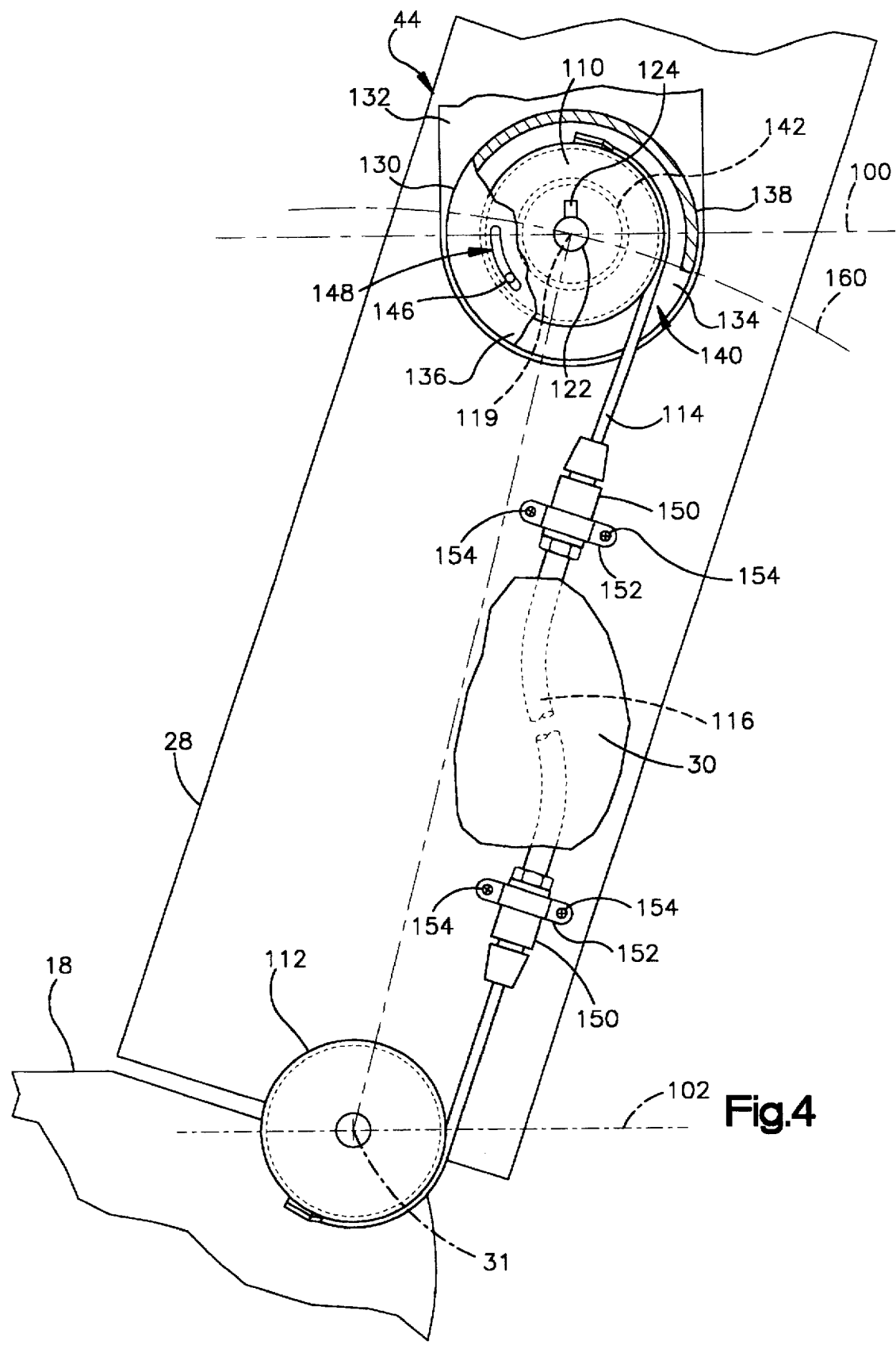
FIG. 4 is an enlarged, partly schematic view of other parts shown in FIG. 1.

A spindle 122 with a spline 124 projects outward, i.e., in a direction extending upward from the page as viewed in FIGS. 2 and 3, from the ball housing 92 along the axis 119. As shown in FIG. 4, the upper pulley 110 is received coaxially over the spindle 122 and the spline 124. The spindle 122 and the spline 124 together establish a rotational driving connection between the upper pulley 110 and the hub 118 (FIGS. 2 and 3).

A pulley cover 130 encloses the upper pulley 110. Preferably, the pulley cover 130 is mounted on a larger cover structure 132 which encloses the frame 70 and the other parts of the retractor 44. The pulley cover 130 has a circular inner side wall 134 and a circular outer side wall 136. A short cylindrical rim wall 138 of the pulley cover 130 extends axially between the side walls 134 and 136. The rim wall 138 is circumferentially discontinuous so as to define a slot 140 extending partly around the circumference of the pulley cover 130.

A torsion spring 142 (shown schematically) is connected between the upper pulley 110 and the inner side wall 134 of the pulley cover 130. The torsion spring 142 biases the upper pulley 110 to rotate about the axis 119 in a counterclockwise direction, as viewed in FIG. 4. As an optional feature, a boss 146 on the upper pulley 110 projects through a slot 148 in the outer side wall 136. The boss 146 limits rotation of the upper pulley 110 to a range defined between the opposite ends of the slot 148.

As further shown in FIG. 4, the cable 114 is wound partially around the lower pulley 112 in a clockwise direction. The cable 114 is wound partially around the upper pulley 110 in a counterclockwise direction, and thus extends between the pulleys 110 and 112 under tension induced by the torsion spring 142. The conduit 116 is located in the seat back 16 between the upper frame 28 and the surrounding cover 30. A pair of end fittings 150 on the conduit 116 are fixed to the upper frame 28, such as by U-shaped brackets 152 with fasteners 154, and guide the cable 114 tangentially away from the pulleys 110 and 112. The lower pulley 112 is centered on the pivotal axis 31 of the upper frame 28, but is immovably mounted on the lower frame 18.

When a vehicle occupant reclines the seat back 16, the upper frame 28 moves pivotally about the axis 31 in a clockwise direction, as viewed in FIG. 1. As viewed in FIG. 4, the upper pulley 110 moves from left to right along a circular path 160 centered on the axis 31. The conduit 116, the end fittings 150, and the cable 114 also move from left to right along circular paths centered on the axis 31. Such movement of the cable 114 causes it to unwind slightly from the lower pulley 112.

Unwinding of the cable 114 from the lower pulley 112 tends to introduce slack in the cable 114 between the upper and lower pulleys 110 and 112. However, as the cable 114 unwinds from the lower pulley 112, the torsion spring 142 simultaneously pulls the cable 114 longitudinally upward through the conduit 116, and winds an equal length of the cable 114 onto the upper pulley 110, by rotating the upper pulley 110 in the counterclockwise direction, as viewed in FIG. 4. The hub 118 (FIGS. 2 and 3) and the inertia locking mechanism 60 rotate about the axis 119 in the counterclockwise direction with the upper pulley 110. The inertia locking mechanism 60 is thus rotated a controlled amount which corresponds to the amount of winding and longitudinal movement imparted to the cable 114 upon pivotal movement of the seat back 16. The controlled amount of rotation maintains the baseline 100 of the inertia locking mechanism 60 parallel to the baseline 102 of the lower frame 18. In this manner, the pulleys 110 and 112, the cable 114 and the torsion spring 142 cooperate independently of the force of gravity to maintain the predetermined orientation of the inertia locking mechanism 60 relative to the lower frame 18 when the seat back 16 is being reclined by a vehicle occupant.

The predetermined orientation of the inertia locking mechanism 60 is maintained in a similar manner when a vehicle occupant raises the seat back 16. The upper frame 28 then moves pivotally about the axis 31 in a counterclockwise direction, as viewed in FIG. 1. As viewed in FIG. 4, the upper pulley 110 moves from right to left along the circular path 160. The conduit 116, the end fittings 150, and the cable 114 move from right to left along corresponding circular paths. Such movement of the cable 114 causes it to wind further onto the immovable lower pulley 112. Further winding of the cable 114 onto the lower pulley 112 increases the tension in the cable between the upper and lower pulleys 110 and 112. The increased tension in the cable 114 rotates the upper pulley 110 in the clockwise direction against the bias of the torsion spring 142. The cable 114 is unwound from the upper pulley 110, and is pulled longitudinally downward through the conduit 116, in an amount equal to the amount that the cable 114 is further wound onto the lower pulley 112. The hub 118 (FIGS. 2 and 3) and the inertia locking mechanism 60 rotate a corresponding amount in the clockwise direction with the upper pulley 110. As a result, the baseline 100 of the inertia locking mechanism 60 remains parallel to the baseline 102 of the lower frame 18.

In accordance with a particular feature of the present invention, the pulleys 110 and 112 have equal radii. The axes 119 and 31 of the pulleys 110 and 112 are parallel and at a fixed distance from each other. These are the preferred parameters for causing the cable 114 to wind onto one pulley 110 or 112 simultaneously and equally as it unwinds from the other pulley 112 or 110, as described above, when the upper frame 28 pivots on the lower frame 18. Although the pulleys 110 and 112 in the preferred embodiment of the present invention are fully circular structures, either of the pulleys 110 and 112 could be replaced with an arcuate segment or any other suitable pulley structure capable of winding and unwinding an elongated flexible driving member in accordance with the present invention.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a vehicle seat with an upper frame supported to tilt on a lower frame;
   an emergency locking mechanism on said upper frame; and orientation means for maintaining a predetermined orientation of said emergency locking mechanism relative to said lower frame independently of the force of gravity when said upper frame tilts on said lower frame, said orientation means including an elongated flexible driving member extending between said upper and lower frames;

said orientation means moving said driving member longitudinally in one direction in response to tilting of said upper frame, and moving said driving member longitudinally in an opposite direction in response to opposite tilting of said upper frame;

said orientation means tilting said emergency locking mechanism a controlled amount relative to said upper frame in response to said longitudinal movement of said driving member.

2. Apparatus as defined in claim 1 wherein said orientation means moves said driving member in said first direction by winding said driving member onto a pulley structure on said lower frame, and moves said driving member in said opposite direction by unwinding said driving member from said pulley structure.

3. Apparatus as defined in claim 2 wherein said orientation means guides said driving member tangentially away from said pulley structure, and moves said driving member along a circular path extending circumferentially around said pulley structure, when said upper frame tilts on said lower frame.

4. Apparatus as defined in claim 2 wherein said pulley structure is fixed relative to said lower frame.

5. Apparatus as defined in claim 2 wherein said pulley structure is immovably mounted on said lower frame.

6. Apparatus as defined in claim 2 wherein said upper frame is supported for tilting movement consisting of pivotal movement about a fixed pivotal axis, said pulley structure being centered on said pivotal axis.

7. Apparatus as defined in claim 2 wherein said orientation means includes an upper pulley structure supported on said upper frame for rotation with said emergency locking mechanism, said orientation means rotating said upper pulley structure by winding said driving member onto said upper pulley structure, and by unwinding said driving member from said upper pulley structure, in response to said longitudinal movement of said driving member.

8. Apparatus as defined in claim 7 wherein said driving member is wound onto one of said pulley structures and is unwound simultaneously and equally from the other of said pulley structures when said upper frame tilts on said lower frame.

9. Apparatus as defined in claim 8 wherein said orientation means further includes a spring biasing said upper pulley structure to rotate in a winding direction, said driving member extending between said pulley structures under tension induced by said spring.

10. Apparatus as defined in claim 1 wherein said driving member is a steel cable.

11. Apparatus comprising:

a vehicle seat with an upper frame supported to tilt on a lower frame;

a lower pulley structure fixed relative to said lower frame;

an upper pulley structure rotatably supported on said upper frame;

an emergency locking mechanism connected to said upper pulley structure for rotation with said upper pulley structure;

a spring biasing said upper pulley structure to rotate; and a flexible driving member extending between said pulley structures under tension induced by said spring;

said driving member rotating said upper pulley structure against the bias of said spring upon tilting of said upper frame, said spring rotating said upper pulley structure oppositely upon opposite tilting of said upper frame, whereby said driving member, said spring and said pulley structures cooperate independently of the force of gravity to maintain a predetermined orientation of said emergency locking mechanism relative to said lower frame when said upper frame tilts on said lower frame.

12. Apparatus as defined in claim 11 wherein said upper frame is supported on said lower frame for tilting movement consisting of pivotal movement about a fixed pivotal axis.

13. Apparatus as defined in claim 11 wherein said driving member is wound onto one of said pulley structures and is unwound simultaneously and equally from the other of said pulley structures when said upper frame tilts on said lower frame.

14. Apparatus as defined in claim 13 wherein said pulley structures have equal radii and have respective central axes that are fixed relative to each other.

15. Apparatus as defined in claim 11 further comprising a guide structure which guides said driving member tangentially away from each of said pulley structures.

16. Apparatus as defined in claim 15 wherein said guide structure comprises a conduit through which said driving member moves longitudinally between said pulley structures.

* * * * *